(12) United States Patent
Paltin et al.

(10) Patent No.: US 6,655,082 B1
(45) Date of Patent: Dec. 2, 2003

(54) SOIL DISINFECTING DEVICE

(75) Inventors: Eli Paltin, Yosef (IL); Avi Ellert, Meitar (IL)

(73) Assignee: C.K.M. Advanced Agriculture Ltd., Moshav Talmei Yosef (IL)

( * ) Notice: Subject to any disclaimer, the term of this patent is extended or adjusted under 35 U.S.C. 154(b) by 0 days.

(21) Appl. No.: 09/646,203

(22) PCT Filed: Nov. 16, 1999

(86) PCT No.: PCT/IL99/00615
§ 371 (c)(1),
(2), (4) Date: Sep. 14, 2000

(87) PCT Pub. No.: WO00/40070
PCT Pub. Date: Jul. 13, 2000

(30) Foreign Application Priority Data

Dec. 30, 1998 (IL) .................................. 127838

(51) Int. Cl.⁷ ........................... A01G 11/00; A01B 33/16
(52) U.S. Cl. ............................... 47/1.42; 43/144
(58) Field of Search .................. 47/1.42, 1.44; 43/124, 144

(56) References Cited

U.S. PATENT DOCUMENTS

| | | | |
|---|---|---|---|
| 2,602,388 A | * | 7/1952 | Elliott et al. ................ 47/1.42 |
| 2,617,341 A | | 11/1952 | Clayton et al. |
| 2,682,728 A | * | 7/1954 | Nisbet et al. |
| 2,966,128 A | | 12/1960 | Toulmin, Jr. |
| 2,986,841 A | | 6/1961 | MacDonald |
| 3,802,020 A | | 4/1974 | Stone et al. |
| 4,420,901 A | | 12/1983 | Clarke |
| 4,750,436 A | | 6/1988 | Maury et al. |
| 5,094,012 A | | 3/1992 | Rosenstock et al. |
| 5,176,445 A | | 1/1993 | Mize |
| 5,188,041 A | | 2/1993 | Noland et al. |
| 5,199,212 A | | 4/1993 | Newcomb |
| 5,213,445 A | | 5/1993 | Ikenberry et al. |
| 5,405,579 A | | 4/1995 | Melzer et al. |
| 5,499,586 A | | 3/1996 | Davis |
| 5,553,414 A | * | 9/1996 | Chapman et al. ............ 47/1.42 |
| 5,776,422 A | * | 7/1998 | Kawasaki ................ 47/1.42 Z |

FOREIGN PATENT DOCUMENTS

| | | | |
|---|---|---|---|
| CH | 563102 | * | 6/1975 |
| DE | 89 01 761.7 | | 4/1989 |
| FR | 1574916 | | 7/1969 |

* cited by examiner

*Primary Examiner*—Charles T. Jordan
*Assistant Examiner*—Jeffrey L. Gellner
(74) *Attorney, Agent, or Firm*—Dilworth & Barrese LLP

(57) ABSTRACT

A mobile soil-disinfecting device (10) comprising a cultivating unit (20), a soil treating chamber (23), a bellows (28), a heat exchanger (56), and a heat-generating unit (26). The cultivating unit (20) comprises one or more cultivating members adapted for breaking the soil and throwing it upwardly into the soil treating chamber (23), and the heat exchanger (56) being in thermal communication with the heat generating unit (26), the bellows (28) adapted for drawing ambient air, passing the air through the heat exchanger (56) and throwing hot air into the soil treating chamber (23).

27 Claims, 5 Drawing Sheets

SOIL DISINFECTING DEVICE

FIELD OF THE INVENTION

This invention relates to agriculture machinery for soil disinfection. In particular, the invention is concerned with such a mobile device.

BACKGROUND OF THE INVENTION AND PRIOR ART

Soil disinfection is a standard procedure among crop growers in agriculture industry and in large scale home gardening. The disinfection process is aimed towards extermination of soil pests such as bacteria, nematodes, viruses and insects at different growth stages, undesired seeds, fungi, weeds, etc., in an attempt to make the agricultural soil more productive and to prevent diseases from damaging or reducing the agricultural crops.

By referring to the device as mobile, it is meant that it is capable of either being self-propelled or may be towed or dragged by a suitable agricultural machine such as a tractor, etc.

The common use of organic chemicals in particular methyl bromide has now been known for a while to create severe environmental problems and it is an ever growing desire to reduce to a minimum such disinfecting methods wherein at some cases chemical disinfecting is already forbidden. Other known methods for soil disinfecting are injecting steam into the soil by suitable machinery, passing steam through suitable piping embedded in the soil, firing the soil by flame throwers and others.

U.S. Pat. No. 2,966,238 discloses a device for cultivating and disinfecting a discreet portion of soil in one continuous operation, where disinfection is achieved by the use of chemicals and the soil is heated while elevated on the conveyor.

U.S. Pat. No. 2,986,841 describes a mobile earth treating apparatus wherein earth is scraped and broken up and then thrown up while being subjected to the effect of a spraying device or a flame thrower.

U.S. Pat. No. 5,553,414 discloses a mobile device for destroying soil borne pests, the device comprising a lift for raising soil from the ground, a drum in which the soil is heated and a discharger for discharging the treated soil in the ground.

U.S. Pat. No. 4,420,901 discloses a mobile device for flame treating of soil, the device comprising an elongated tube member in which the soil is conveyed by a screw-type conveyor while being flamed.

U.S. Pat. No. 5,199,212 discloses a soil decontamination system including a pulverizer and a heater volatilizing contaminants which are then burned as fuel in an internal combustion engine.

U.S. Pat. No. 5,776,422 discloses an apparatus for cleaning top soil, e.g. of a playground. The device is adapted for evenly sterilizing the soil by lifting it, passing it through the machine disinfecting it and then discharging it back.

U.S. Pat. No. 5,405,579 discloses a method for soil decontamination by passing excavated soil to a thermal treatment zone, heating the soil at super atmospheric pressure within a rotary drum, at the absence of oxygen, wherein resultant gasses pollutant steam is condensed and separated.

U.S. Pat. No. 5,176,445 discloses retrofitting asphalt production plant into a device capable of efficiently decontaminating soil.

Other patents which are in the general field of the invention are U.S. Pat. Nos. 5,188,041, 5,213,445, 5,094,012, 4,750,436, 5,499,586 and 3,802,020.

SUMMARY OF THE INVENTION

The present invention is concerned with a mobile device for disinfecting soil, avoiding the use of chemicals.

In accordance with the invention there is provided a mobile soil disinfecting device comprising a cultivating unit, a soil treating chamber, at least one bellows, at least one heat exchanger and at least one heat generating unit; the cultivating unit comprises one or more cultivating members adapted for breaking the soil and throwing it upwardly into the soil-treating chamber wherein the at least one heat exchanger is in thermal communication with the at least one heat generating unit and the at least one bellows is adapted for drawing ambient air, passing it through the at least one heat exchanger and throwing hot air into the soil treating chamber for disinfecting the soil at a suitable temperature.

The device in accordance with the present invention is suitable for cultivating soil at a variety of practical depths from about 5 to about 75 cm. This feature is of significant importance as it provides efficient disinfecting of the soil to a critical depth, this being in contrast to some of the prior art devices teaching disinfection up to a fixed depth or only of the upper layer of the soil.

The device is capable of cultivating fine layers of soil, without any additional beating or pulverizing means and typically, the cultivating members are rotatable at a speed suitable for throwing soil into the soil-treating chamber more than once at a single path of the device. In a desired mode of operation, the soil is broken into grains.

By a specific example of the present invention, the cultivating unit comprises between 3 and 48 cultivating members, usually of equal length, each being about 40 to 90 cm long. The cultivating members are fixed to a common horizontal axis rotatable at about 60 to 120 rpms. This speed range allows for loosening fine layers of soil which is spontaneously pulverized while lifted in the air. The velocity at which the device is moved along the ground surface depends, among others, on the speed of rotation of the cultivating members, the nature of soil and its humidity state, the cultivated depth etc. Typically, the velocity of the device is between 75 and 400 meters per hour.

By a preferred design of the device, the cultivating unit further comprises a surface engaging arrangement for retaining it at a fixed level above the ground surface and for overcoming obstacles. The vertical distance between the ground surface and the axis of rotation of the cultivating members may be adjusted so as to obtain varying cultivating depth.

The temperature of the air thrown into the soil treating chamber is typically in the range of between about 200° C. and 700° C. However, it will be appreciated that the soil is not burnt as the temperature of the warm air thrown into the cultivating chamber is adapted for destroying the pests but below the temperature burning the soil. An important feature of the present invention is that the temperature of the soil treated within the soil-treating chamber does not exceed about 15° C. of its initial temperature, i.e. the soil does not burn. The hot air strikes the soil (preferably grains) and destroys the organisms and plant biological organisms residing in the soil.

The heat generating unit typically comprises a burner, a combustion chamber and exhaust means. The burner may be either gas or fuel operated or, in some other instances, may be also coal operated.

The temperature within the combustion chamber is in the range of about 1300° C. and the specific heat may be in the range of about 100K to 250 K calories.

In accordance with one specific embodiment, there may be provided a preheating device. By one specific example, preheating takes place over an exhaust pipe extending through a suitable chamber or extending along the opening in the outer wall of the combustion chamber, through which air enters the heat exchanger from the bellows. In accordance with still another embodiment, the temperature of the air is gradually increased in at least two heating stages.

Furthermore, the soil does not come into contact with the burned gases of the heat generating unit. These features avoid degrading of the soil's quality and retain fertility of the soil as compared with soil treated by prior art devices.

In addition, the device in accordance with the invention is found to be more energy saving than prior art of such devices wherein disinfecting the soil is about half the price of disinfecting the soil with a compared unit area using relevant prior art devices.

Even more so, it is an advantage of the device in accordance with the invention that after treatment, the soil is ready for use, i.e. it is already cultivated and disinfected, and there is no need for further preparations whatsoever prior to sowing.

BRIEF DESCRIPTION OF THE DRAWINGS

For better understanding the invention and to see how it may be carried out in practice, some preferred embodiments will now be described, by way of non-limiting examples only, with reference to the accompanying drawings, in which.

DETAILED DESCRIPTION OF SOME PREFERRED EMBODIMENTS

Figure 1:
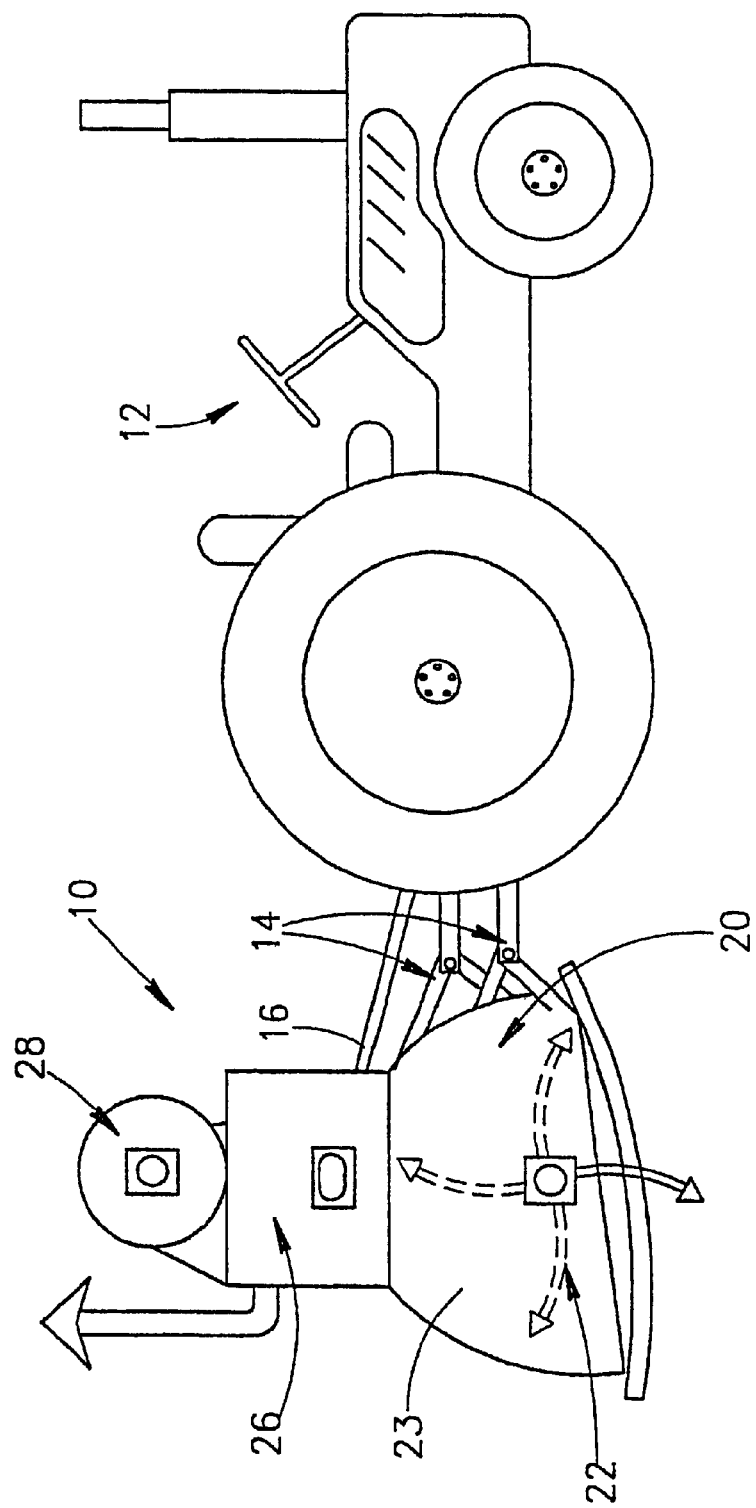
FIG. 1 is a general view of a soil disinfecting device articulated to a tractor.

In FIG. 1, there is illustrated a soil disinfecting device generally designated 10, towed by a tractor 12, by three arms 14 (only two seen) which serve also for adjusting the level of the device 10 from the ground's surface, as known per se in agricultural machinery. A shaft 16 transfers rotational motion from a transmission box of the tractor (not seen) to a suitable coupling of the soil disinfecting device (not seen).

Figure 2:
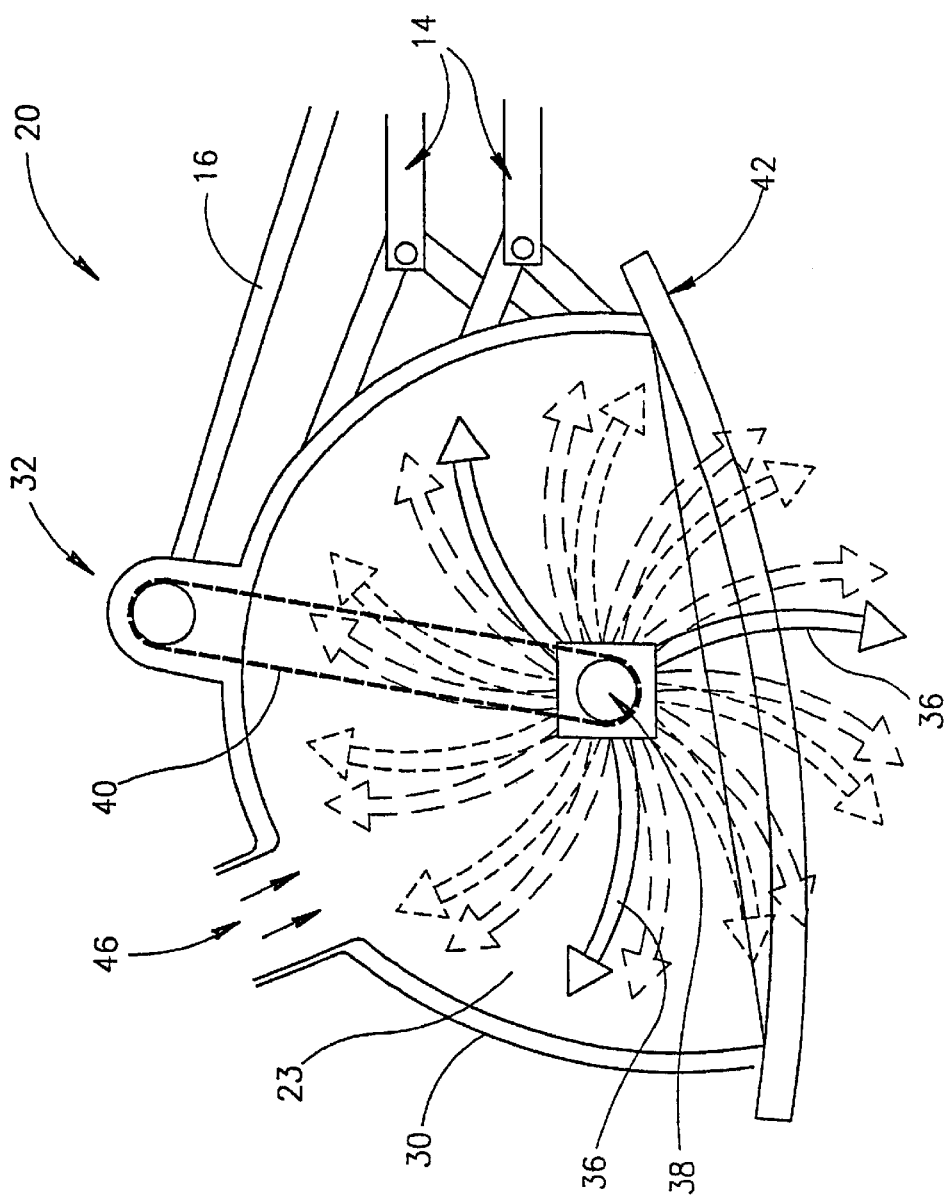
FIG. 2 is a detailed view of the cultivating unit of the device seen in FIG. 1.
Figure 3A:
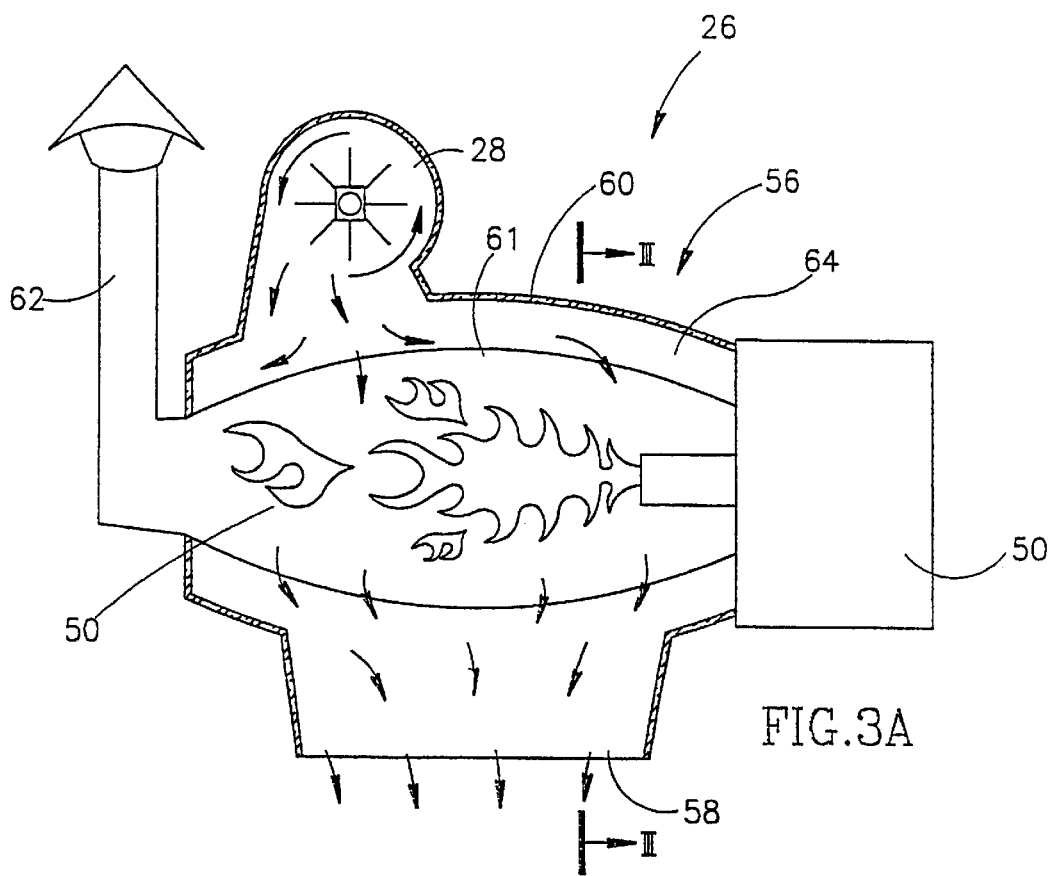
FIG. 3A is a sectioned view of a heating assembly according to one embodiment used in accordance with the present invention.
Figure 3B:
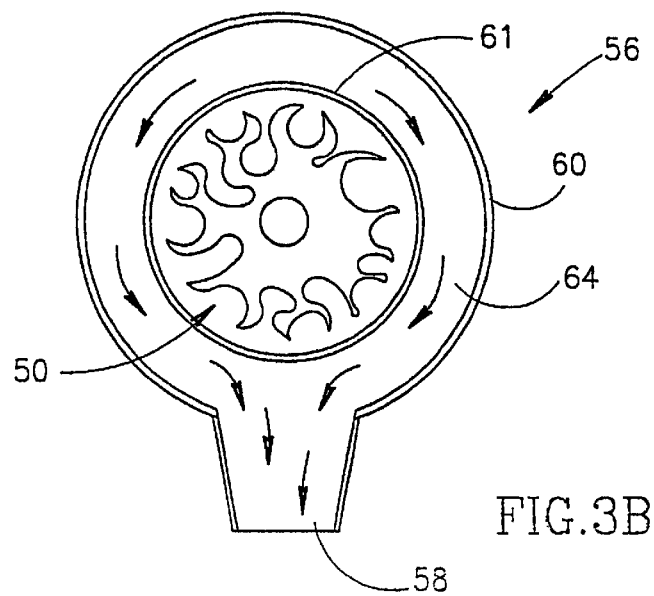
FIG. 3B is a section along line III—III in FIG. 3A.
Figure 4:
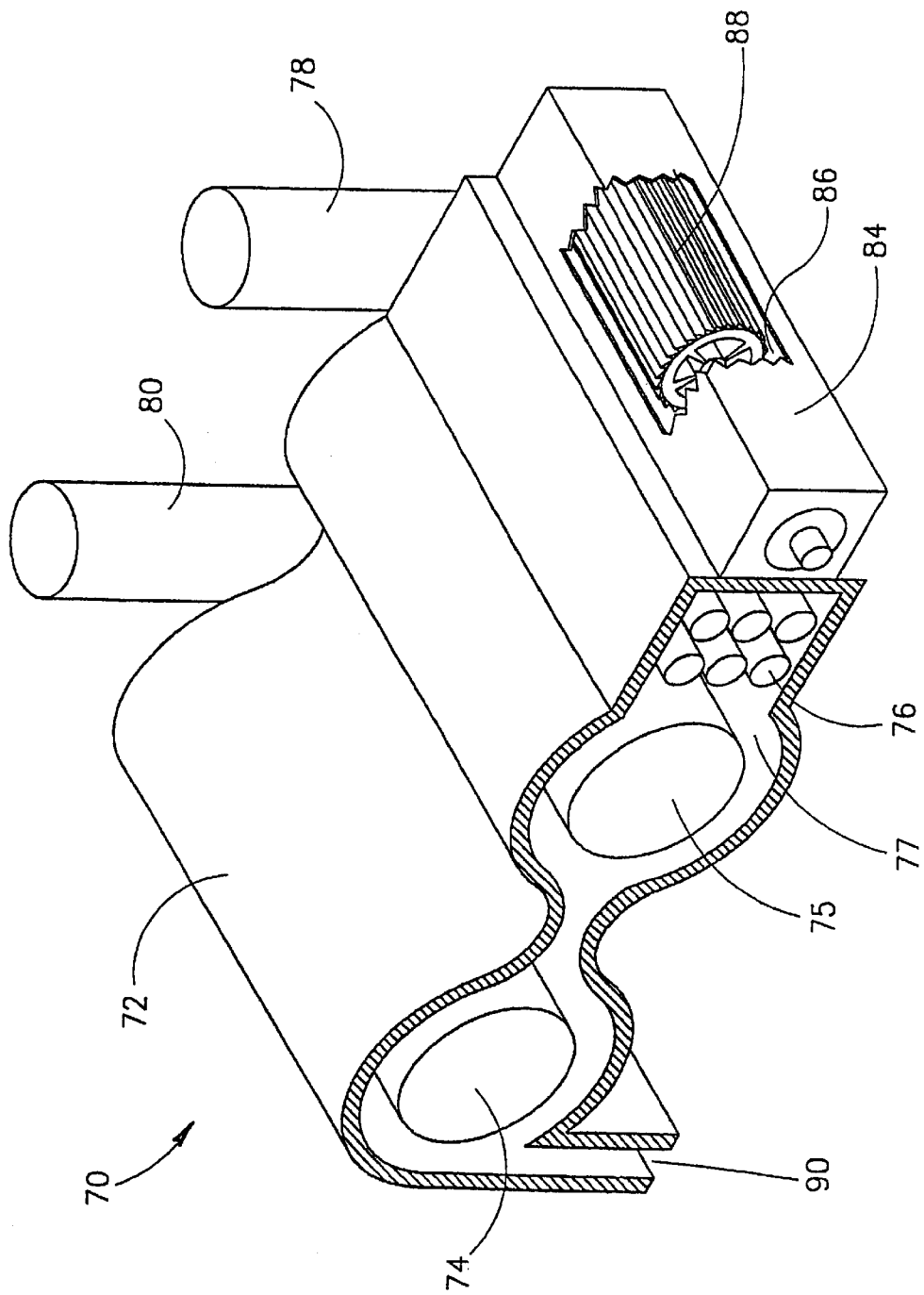
FIG. 4 is a sectioned view of a heating assembly according to a second embodiment, used in a device in accordance with the present invention.
Figure 5:
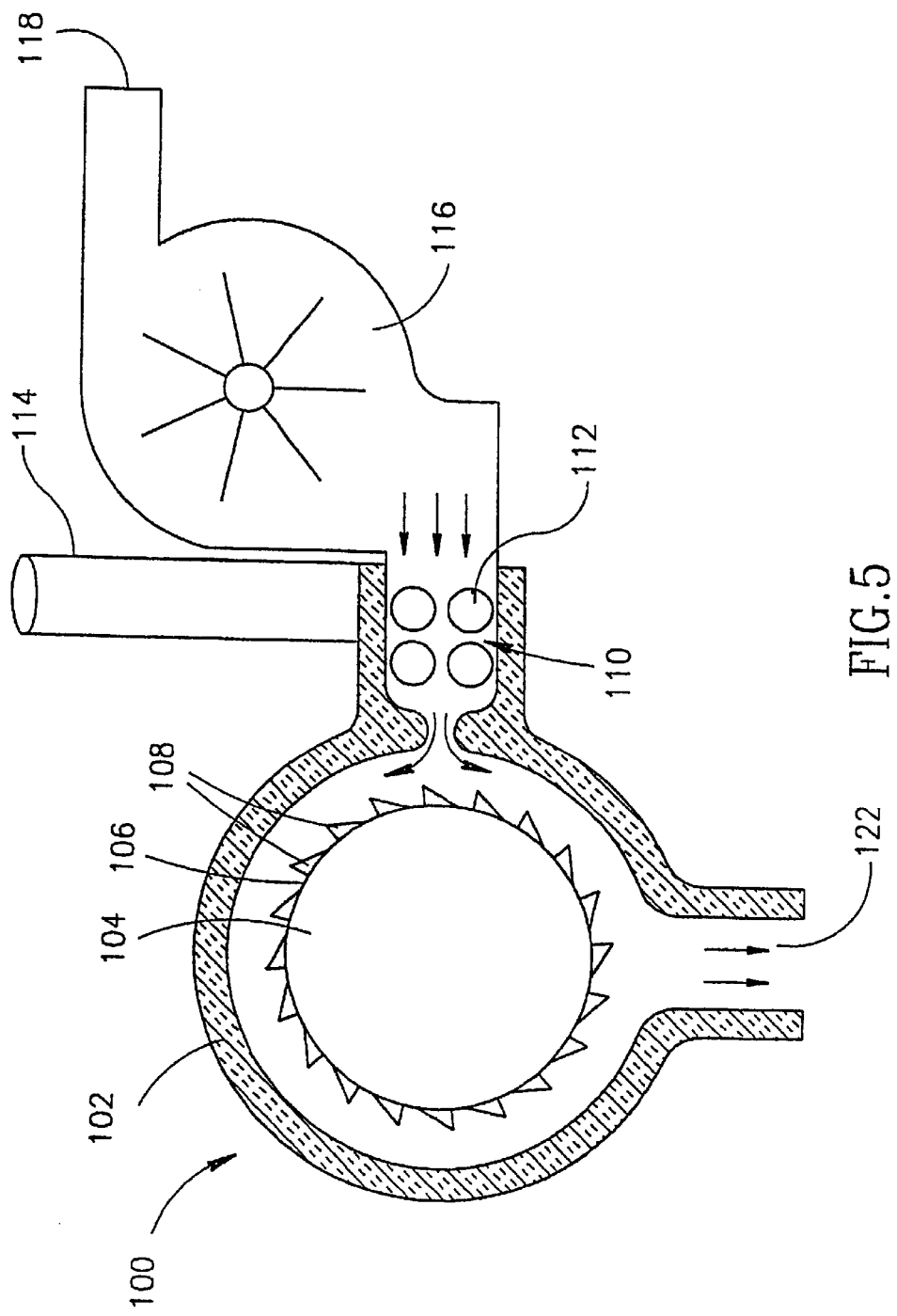
FIG. 5 is a sectional view of a different embodiment of a heating assembly used in a device in accordance with the present invention.

The soil disinfecting device 10 comprises a cultivating unit 20 fitted with a cultivating assembly 22 which will be referred to in more detail with reference to FIG. 2, a soil treating chamber 23, a heat generating assembly 26 which will be referred to in more detail with reference to FIGS. 3 to 5 and a bellows 28 mounted above the heat generating assembly 26. However, one will appreciate that the bellows may also be mounted aside the heat generating assembly.

Further attention is now directed to FIG. 2 illustrating in somewhat more detail the cultivating unit 20, wherein the housing 30 is at least partially thermally isolated and is supported by hydraulic arms 14 connected to the tractor (not shown in this figure), and wherein shaft 16 transfers rotational motion from a suitable output at the tractor to a suitable coupling 32 of the cultivator 20.

Cultivator unit 20 comprises a plurality of cultivating arms 36 fixed to a common axle 38 which is rotatable by means of a transmission belt 40, (or by any other mechanical equivalent, e.g. a gear train etc.) coupled in turn to the coupling 32, wherein rotation of the shaft 16 entails rotation of axle 38 together with the cultivating arms 36 which, as can be seen in FIG. 2, extend below the surface of gliding members 42 for supporting the device over the ground's surface and to facilitate overcoming obstacles on the ground, e.g. stones, large clods, bushes, etc.

By a different embodiment of the present invention (not illustrated) the distance of axle 38 from the ground's surface may be adjusted either by displacing glides 42 with respect to the housing 30 or by vertically displacing axle 38 within the housing 30. However, conventional means for changing the elevation of cultivating unit 20 is obtained by means of the hydraulic arms 14 supported by the tractor, as known, per se.

As can further be seen in FIG. 2, housing 30 of the cultivating unit 20 comprises an opening 46 which as will be explained hereinafter, extends below a heat generating assembly as seen by way of examples in FIGS. 3 to 5.

Referring now to FIGS. 3A and 3B, the heat generator assembly 26 is schematically shown wherein it comprises a heat generating unit 50, typically being a gas or fuel burner having an opening extending into a heat exchanger 56 fitted with an opening 58 and when mounted over the cultivating unit 20 (see FIG. 1) extends over opening 46 of the cultivating unit 20.

Heat exchanger 56 is preferably formed with an isolating coat 60 constituting a heat exchanging chamber 64 and is formed with a chimney 62. Mounted above the heat exchanger 56 there is the bellows 28 (not seen in FIG. 3B) which is adapted for drawing ambient air through a suitable opening (not seen), passing it through the heat exchanger chamber 64 and then throwing hot air into the soil treating chamber 23 through openings 58 and 46, respectively.

Soil disinfecting is carried out by dragging the device 10 over the ground's surface wherein the cultivating arms 36 penetrate into the soil, to a desired depth, loosening and breaking a layer of soil (mainly depending on the depth of penetration) and throwing it into the space of the soil treating chamber 23.

Hot air is generated in burner 50 and is thrown into the heat exchanger 56. Ambient air is drawn by bellows 28 via suitable openings (refer below to specific embodiments seen in FIGS. 4 and 5) wherein air within the heat exchanger is heated and is then thrown via opening 58 into the soil treating chamber 23 of cultivating unit 20, via opening 46. Burnt gas/fuel is evacuated via chimney 60 which may also serve as a preheating device, as will be shown hereinbelow with reference to FIGS. 4 and 5.

It will be appreciated that the speed of traveling of the tractor and the speed of rotation of axle 38 of the cultivating unit 20, as well as the elevation of axle 38 from the ground's surface, control the size of the clods thrown into the soil treating chamber 23. Preferably, the soil thrown into the soil treating chamber 23 is of size to allow sufficient contact with the hot air thrown into the chamber so as to disinfect the soil.

In accordance with one embodiment, the device is suitable for cultivating soil to a depth between 5 and 75 cm. By a preferred embodiment, the cultivating arms 36 are rotatable at about 60 to 120 rmps. In accordance with one specific embodiment, the temperature within the soil treating chamber 23 is in the range of between 200° C. and 700° C. wherein the temperature within the combustion chamber 50 reaches about 1300° C. It was found that good disinfecting results were obtained when the cultivating unit breaks the soil to slices of thickness of about 0.5 to 2.0 cm.

A skilled person will appreciate that after performing a soil disinfecting procedure using a device in accordance with the present invention, the soil is in fact ready for sowing, not requiring any further treatment, contrary to use of some other prior art devices.

A significant importance of the device is that the treated soil does not come into contact with burnt gases of the heat generating unit, and that the temperature of the soil within the soil treating chamber increases by only about up to 15° C., thereby ensuring optimal soil quality.

In accordance with one embodiment of the device, 200 liters of diesel fuel were found to be sufficient for disinfecting one dunam of soil requiring only about three hours.

Further attention is now directed to FIG. 4 illustrating a different embodiment of a heat assembly generally designated 70 which comprises a thermally isolated housing 72 having an 8-like sectional shape formed with two burners 74 and 75, a preheating piping assembly 76 terminating at chimney 78 and a second chimney 80 connected to the first burner 74. A bellows 84 has an ambient air inlet opening 86 and a turbine member 88 for throwing the ambient air onto the preheating pipes 76, which preheated air is then thrown into space 77 around the first stage heater 75 and then to space 79 around the final heater 74. The heated air is then propelled via opening 90 into the opening of the soil disinfecting chamber (46 in FIG. 2).

It will be appreciated that the preheating piping assembly 76 may be omitted. However, in order to reach a maximum temperature at outlet 90 it is desirable to heat ambient air at several stages.

In a different embodiment seen in FIG. 5, there is a heat exchanger 100 formed with a thermally isolated coating 102 and having an internal heat chamber burner 104 having an external wall 106 formed with a plurality of bulges 108, thus increasing the surface area thereof for improved heat transfer and air turbulance. A preheating assembly 110 is formed of a plurality of pipes 112 extending from the heat exchanger and terminating at a chimney 114. A bellows 116 draws ambient air via opening 118 and propels it, via the preheating assembly 110, to the heat exchanger 100 and then, via outlet opening 122, the heated air is propelled into the opening of the soil treating chamber (46 in FIG. 2).

In accordance with another embodiment of the invention, the soil disinfecting chamber may be fitted with two inlet openings, each associated with an independent heat generating assembly, for increasing the thermal efficiency of the device.

One will also appreciate that suitable control means are provided for controlling the different parameters of the device, e.g. heat generation, air flow, speed and depth of cultivation, travelling speed etc.

While it has not been illustrated, a skilled person will appreciate that other embodiments and modifications are possible as well, by example, the soil disinfecting device may be self-propelled, i.e. rather than being dragged/towed by a tractor or other agricultural machinery, the device may be fitted with a suitable motor and steering means as known.

What is claimed is:

1. A mobile soil-disinfecting device (10) comprising a cultivating unit (20), a soil treating chamber (23), a bellows (28), a heat exchanger (56), and a heat-generating unit (50),
   said cultivating unit (20) comprises one or more cultivating members (22) adapted for breaking and upwardly throwing the soil into said soil treating chamber (23),
   said heat exchanger (56) being in thermal communication with said heat generating unit (50),
   said bellows (28) adapted for drawing ambient air, passing the air through said heat exchanger (56) and blowing the heated air into said soil treating chamber (23),
   wherein a separation (61) within said heat exchanger (56) precludes intercommunication of combustion gases in said heat exchanger (56) with said air blown by said bellows (28).

2. A mobile soil-disinfecting device according to claim 1, wherein said cultivating members (22) are rotatable at a speed permitting them to throw a portion of soil into the soil-treating chamber (23) more than once.

3. A mobile soil-disinfecting device according to claim 2, wherein said cultivating members (22) are rotatable at about 60 to 120 rpm.

4. A mobile soil-disinfecting device according to claim 1 that is capable of cultivating soil at any depth from about 5 cm to about 75 cm.

5. A mobile soil-disinfecting device according to claim 4, wherein said cultivating members (22) are about 30 to 90 cm long.

6. A mobile soil-disinfecting device according to claim 1, wherein said cultivating unit (20) comprises between 1 and 48 cultivating members (22).

7. A mobile soil-disinfecting device according to claim 6, wherein the cultivating depth is adjustable by adjusting the vertical location of an axis (38) supporting the cultivating members (22).

8. A mobile soil-disinfecting device according to claim 7, in which the cultivating unit (20) may be vertically adjusted by displacement of arms (14) connecting the device (10) to a towing agricultural machine (12).

9. A mobile soil-disinfecting device according to claim 1, further comprising a surface engaging arrangement (42) for retaining the cultivating unit (20) at a fixed level above the ground surface.

10. A mobile soil-disinfecting device according to claim 9, wherein the surface engaging arrangement (42) is in the form of sliding/gliding members.

11. A mobile soil-disinfecting device according to claim 1, wherein the air in the soil-treating chamber (23) is at a temperature in the range of between about 200° C. and about 700° C.

12. A mobile soil-disinfecting device according to claim 1, wherein the heat generating unit (50) comprises a burner, which is operated by fuel or gas.

13. A mobile soil-disinfecting device according to claim 1, wherein the temperature inside the heat generating unit is around 1300° C.

14. A mobile soil-disinfecting device according to claim 1, wherein the heat-generating unit produces 100K to 250K calories.

15. A mobile soil-disinfecting device according to claim 1, wherein the heat generating device comprises two or more burners (74:75) and the heat exchanger comprises at least two stages, a first stage receiving ambient air allowing it to be heated by the first burner (75) and a second stage, receiving heat from said first stage and allowing it to be heated by the second burner (74) and to flow further into the soil treating chamber.

16. A mobile soil-disinfecting device according to claim 1, wherein burnt gases generated within the heat-generating unit do not interfere with the treated soil.

17. A mobile soil-disinfecting device according to claim 1, wherein the temperature of the soil within the soil-treating chamber does not exceed about 15° C. from its initial soil temperature.

18. A mobile soil-disinfecting device in accordance with claim 1, wherein said one or more cultivating members (22) is structured and arranged for breaking the soil and throwing it upwardly into said soil treating member (23), and said bellows (28) is structured and arranged for drawing the ambient air, passing the air through said heat exchanger (56) and throwing hot air into said soil treating chamber (23).

19. A mobile soil-disinfecting device according to claim 18, wherein said cultivating unit (20), soil treating chamber (23), bellows (28), heat exchanger (56) and heat-generating unit (50) are structured and arranged to break up the soil into fine particles which are thrown upwardly into the soil treating chamber (23), thermally treat the soil within the soil treating chamber (23) by introducing hot, uncontaminated air therein and then allow the thus-treated soil to drop back downwardly onto the ground from the soil treating chamber (23) at an approximate location from where the soil was collected.

20. A mobile soil-disinfecting device according to claim 18, wherein said bellows (28), heat exchanger (56) and heat-generating unit (50) are structured and arranged to direct the air through the heat exchanger (56) without exposure to burned gas or fuel.

21. A mobile soil-disinfecting device (10) comprising a cultivating unit (20), a soil treating chamber (23), a bellows (28), a heat exchanger (56), and a heat-generating unit (50), said cultivating unit (20) comprises one or more cultivating members (22) adapted for breaking the soil and throwing it upwardly into said soil treating chamber (23), said heat exchanger (56) being in thermal communication with said heat generating unit (50), said bellows (28) adapted for drawing ambient air, passing the air through said heat exchanger (56) and throwing hot air into said soil treating chamber (23), wherein the heat-generating unit (70) comprises exhaust piping (76), serving also to pre-heat ambient air before it enters the heat-exchange unit.

22. A mobile soil-disinfecting device according to claim 21, wherein said exhaust is designed as pipes (76) that extend along an opening (86) at the outer wall (84) of the burner chamber (74:75).

23. A mobile soil-disinfecting device according to claim 22, wherein said exhaust pipes (76) are positioned between the bellows (88) and the heat exchanger.

24. A mobile soil-disinfecting device (10) comprising a cultivating unit (20), a soil treating chamber (23), a bellows (28), a heat exchanger (56), and a heat-generating unit (50), said cultivating unit (20) comprises one or more cultivating members (22) adapted for breaking the soil and throwing it upwardly into said soil treating chamber (23), said heat exchanger (56) being in thermal communication with said heat generating unit (50), said bellows (28) adapted for drawing ambient air, passing the air through said heat exchanger (56) and throwing hot air into said soil treating chamber (23), wherein walls (106) of the heat exchanger (100) are formed with a plurality of lateral projecting elements (108) for increasing the contact surface area with the treated air and for turbulating the air.

25. A mobile soil-disinfecting device (10) comprising a cultivating unit (20), a soil treating chamber (23), a bellows (28), a heat exchanger (56), and a heat-generating unit (50), said cultivating unit (20) comprises one or more cultivating members (22) adapted for breaking the soil and throwing it upwardly into said soil treating chamber (23), said heat exchanger (56) being in thermal communication with said heat generating unit (50), said bellows (28) adapted for drawing ambient air, passing the air through said heat exchanger (56) and throwing hot air into said soil treating chamber (23), wherein the heat generating device comprises two or more burners (74; 75) and the heat exchanger comprises at least two stages, a first stage receiving ambient air allowing it to be heated by the first burner (75) and a second stage, receiving heat from said first stage and allowing it to be heated by the second burner (74) and to flow further into the soil treating chamber, and the air provided into the first stage is preheated at a preheating unit (76).

26. (Previously amended) A mobile soil-disinfecting device (10) comprising a cultivating unit (20), a soil treating chamber (23), a bellows (28), a heat exchanger (56), and a heat-generating unit (50), said cultivating unit (20) comprises one or more cultivating members (22) adapted for breaking the soil and throwing it upwardly into said soil treating chamber (23), said heat exchanger (56) being in thermal communication with said heat generating unit (50), said bellows (28) adapted for drawing ambient air, passing the air through said heat exchanger (56) and throwing hot air into said soil treating chamber (23), wherein said one or more cultivating members (22) is structured and arranged for breaking the soil and throwing it upwardly into said soil treating chamber (23), said bellows (28) is structured and arranged for drawing the ambient air, passing the air through said heat exchanger (56) and throwing hot air into said soil treating chamber (23), said cultivating unit (20) is situated immediately above ground and comprises a plurality of cultivating arms (36) fixed to a common axle (38) and being rotatable, said soil-treating chamber (23) being situated immediately above said cultivating unit (20) and comprising an upper opening (46) therefrom, said heat exchanger (56) being situated above-said cultivating unit (20) and soil treating chamber (23) and comprising a bottom opening (58) communicating with the upper opening (46) of the cultivating unit (20) and soil treating chamber (23), and said bellows (28) being mounted above said heat exchanger (56).

27. A mobile soil-disinfecting device (10) comprising a cultivating unit (20), a soil treating chamber (23), a bellows (28), a heat exchanger (56), and a heat-generating unit (50), said cultivating unit (20) comprises one or more cultivating members (22) adapted for breaking the soil and throwing it upwardly into said soil treating chamber (23), said heat exchanger (56) being in thermal communication with said heat generating unit (50), said bellows (28) adapted for drawing ambient air, passing the air through said heat exchanger (56) and throwing hot air into said soil treating chamber (23), wherein said heat exchanger (56), bellows (28) and heat generating unit (50) form a heating generator assembly (26), with a path (64) for air from said bellows (28) through said heat exchanger (56) and to said soil treating chamber (23) being sealed off from and only in thermal contact with a path for gas or fuel burned within said heat generating unit (50), directed through said heat exchanger (56) and outwardly from said heat generator assembly unit (26) through a separate chimney (62).

* * * * *